United States Patent
Kakovitch et al.

(10) Patent No.: US 11,470,015 B1
(45) Date of Patent: Oct. 11, 2022

(54) ALLOCATING WORKLOADS TO HETEROGENOUS WORKER FLEETS

(71) Applicant: Amazon Technologies, Inc., Seattle, WA (US)

(72) Inventors: Christopher Kakovitch, Seattle, WA (US); Nils Anders Palumbo, Kirksville, MO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/208,979

(22) Filed: Mar. 22, 2021

(51) Int. Cl.
*H04L 47/78* (2022.01)
*H04L 45/42* (2022.01)
*H04L 47/125* (2022.01)
*H04L 47/762* (2022.01)

(52) U.S. Cl.
CPC .......... *H04L 47/781* (2013.01); *H04L 45/42* (2013.01); *H04L 47/125* (2013.01); *H04L 47/762* (2013.01)

(58) Field of Classification Search
CPC ..... H04L 41/147; H04L 45/42; H04L 47/125; H04L 47/762; H04L 47/781
See application file for complete search history.

(56) References Cited

U.S. PATENT DOCUMENTS

| | | | |
|---|---|---|---|
| 9,128,899 B1* | 9/2015 | McAlister | G06F 11/203 |
| 10,509,667 B1* | 12/2019 | Popuri | G06F 9/45558 |
| 10,574,584 B1* | 2/2020 | Young | H04L 41/0823 |
| 10,979,493 B1* | 4/2021 | Farrugia | H04L 67/1017 |
| 11,128,699 B1* | 9/2021 | Khurrum | G06F 9/45558 |
| 2020/0257566 A1* | 8/2020 | Ganguli | G06F 11/3409 |

* cited by examiner

*Primary Examiner* — Jeong S Park
(74) *Attorney, Agent, or Firm* — Knobbe, Martens, Olson & Bear, LLP

(57) ABSTRACT

Systems and methods are described for allocating requests to implement new workloads within a heterogenous fleet. The fleet can include various sub-fleets, each corresponding to a set of computing devices having a given configuration of computing resources. A routing device can calculate n-dimensional decision surfaces that map expected resource usage associated with an incoming request to probabilities to route the request to each sub-fleet. The decision surfaces can be calculated to maximize cost-weighted headroom across the sub-fleets, with headroom on each sub-fleet reflecting a geometrical dissimilarity in a shape of load on the sub-fleet and a shape of resources available on the sub-fleet. By comparing the expected resource usage associated with the incoming request to the decision surfaces, the device can determine a sub-fleet to which to route the requests.

20 Claims, 5 Drawing Sheets

ALLOCATING WORKLOADS TO HETEROGENOUS WORKER FLEETS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

To support different workloads, the devices within a data center are in some cases heterogenous, having a variety of hardware configurations. For example, different subgroups may have different processor types or speeds, differing memory types or capacities, differing network capabilities, etc. It is generally desirable to route specific workloads to a device with an appropriate hardware configuration to support that workload. Moreover, it is often desirable to "pack" workloads into a minimal number of devices (often subject to various constraints, such as a maximum load on each device). This packing can provide greater efficiency within a data center, as unused devices can be disabled or reallocated to other tasks.

DETAILED DESCRIPTION

Figure 1:
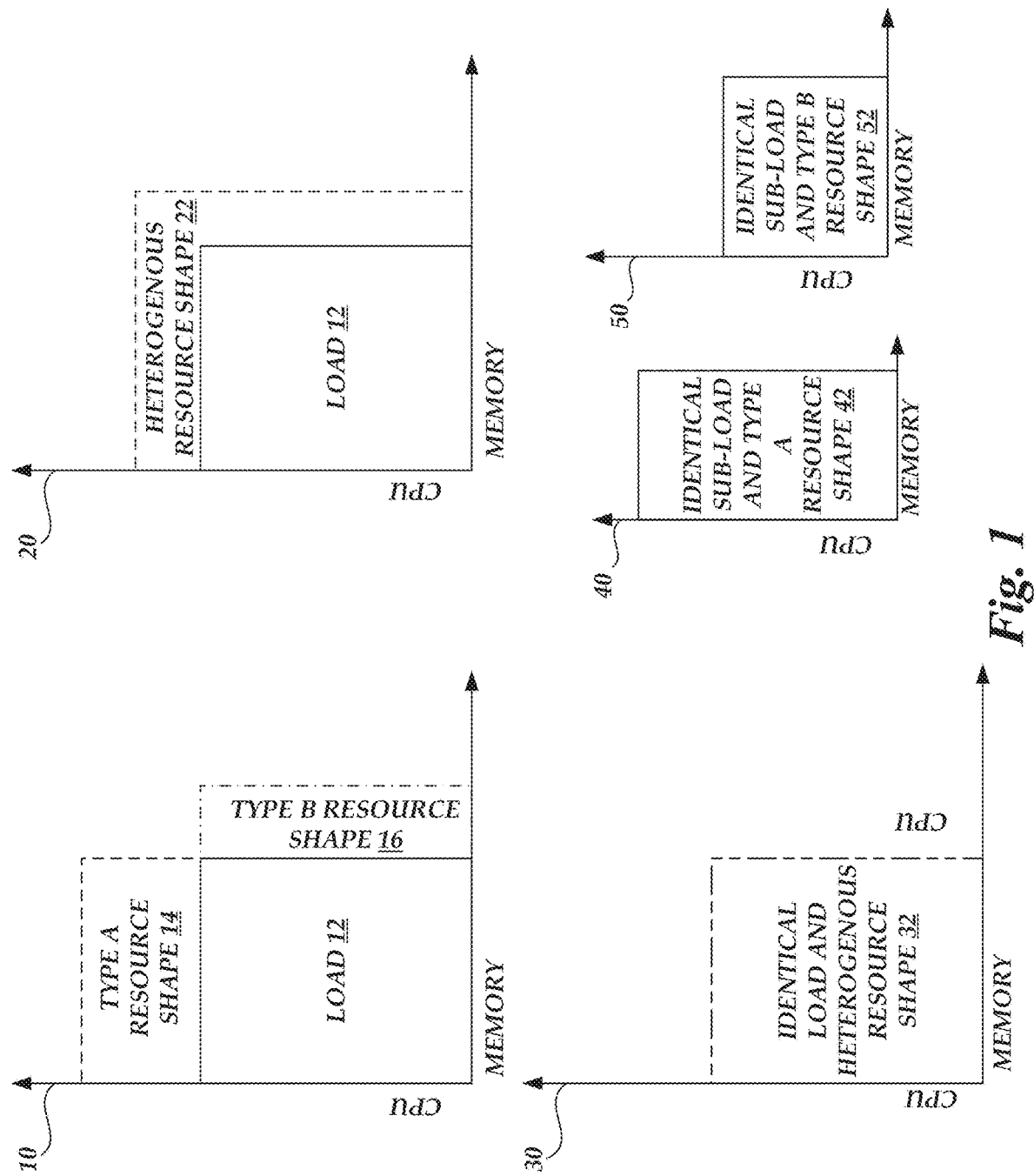
FIG. 1 shows a set of illustrative visualizations of load and resource shapes, demonstrating inefficiencies minimized by embodiments of the present disclosure.

Generally described, aspects of the present disclosure relate to allocating on-demand code executions within a heterogenous fleet, containing server devices having multiple different hardware configurations. More specifically, techniques are disclosed for rapidly distributing an execution to one of a number of device types by generating for each device type a probability surface, which establishes a probability of routing the execution to the device type according to an expected resource usage of the execution. A routing device can therefore rapidly determine, using the decision surfaces, the device type to which an execution is to be routed. As disclosed herein, the decision surface can be established according to an expected aggregate resource usage at devices of each type, such that routing according to the decision surface minimizes an expected total cost, state in terms of resource usage, across the heterogenous fleet. Beneficially, these techniques can be used to route between different device types, without requiring specific analysis of each device within the fleet or selection of a particular device to which to route an execution. The techniques can therefore operate rapidly, overcoming issues that may arise when attempting to select an individual device among a large fleet of heterogenous devices. The techniques can further be combined with homogenous load balancing techniques, such as random selection, to provide for extremely rapid distribution of executions.

As described herein, an on-demand code execution system enables rapid execution of source code, which may be supplied by users of the on-demand code execution system. For example, a user may submit a script in a specific programming language (e.g., the PYTHON™ language) that, when executed, implements network-based processing for a user-facing application (e.g., a mobile device "app"). The on-demand code execution system can then enable the user to submit "calls" to execute that script, at which point the system will securely execute the script to provide the desired functionality. Unlike some other network-based services, an on-demand code execution system can remove the need for a user to maintain or configure a computing device, either virtual or physical, to support code execution. Due to this lack of need for a user to maintain a device, on-demand code execution systems are sometimes referred to as "serverless" systems (though of course the on-demand code execution system itself, as opposed to individual users, may maintain servers to support code execution).

To facilitate rapid on-demand code execution, the system can maintain a variety of execution environments (e.g., virtual machine instances, software containers, etc.) pre-provisioned with software, such as an operating system, code libraries and the like, used during execution of code. Each environment may be provided with access to resources of a host computing device hosting the environment. For example, each environment may be associated with a specific amount of random access memory ("RAM") (e.g., n gigabytes), a specific amount of disk storage, a specific amount of central processing unit ("CPU") time (e.g., milliseconds per second of a host CPU), etc. Because each code execution is unlikely to utilize all resources allocated to its environment, the on-demand code execution system can increase efficiency by "over-subscribing" host resources, such that new environments are added to a host until resource usage of the host exceeds a given level (e.g., 90% used). This technique minimizes the number of resources needed to support the on-demand code execution system.

In one embodiment, the resources available at a device and the resources used by a given on-demand code execution can be modeled as a "shape," with each dimension of the shape representing a respective resource. For example, where a device has m megabytes of memory and n CPU milliseconds, the device may be said to have a "shape" corresponding to a rectangle of m width and n height. Similarly, where an execution is expected to use (e.g., at a given point in time or over a range of time) a megabytes of memory and b CPU milliseconds, the execution can be said to have a shape corresponding to a rectangle of a width and b height. The efficiency of resource use of the device can then be measured by overlaying the shape of total load against the shape of total resources, such that area of the shape of resources available that is not covered by the shape of total load represents excess resources available.

An example of this visualization is shown graph 10 in FIG. 1, which compares a hypothetical load 12 of a given proportion of CPU and memory (e.g., RAM) with resources availabilities of two potential types of devices, each having different shapes (i.e., different proportions of available resources). In the graph 10, all shapes are shown as starting at [0,0] within the graph, such that the load 12 is overlayed on the shapes of resource availabilities. As shown in graph 10, a set of devices of type A have sufficient memory to host the load 12 without any excess memory available. The devices of type A further have more than sufficient CPU to host the load 12, resulting in excess CPU availability. In this example, "excess" may be defined, for example, as an amount above any threshold minimum resources that might be set on the devices. For example, an administrator of a device may target n % memory utilization of all devices (e.g., 80%, 90%, 95%, etc.), such that some memory is available at all times to handle unexpected traffic. Thus, "excess" may indicate that less than n % of resources are being utilized.

Typically, resource types cannot be scaled independently. That is, because each physical device of type A might have a given proportion of CPU and memory, it is typically not possible to "spin down" or reallocate excess CPU resources without also spinning down or reallocating memory resources. The portion of shape 14 shown in FIG. 1 (i.e., that portion not being overlapped by the load 12) therefore represents an inefficiency in resource use. Note that the relative proportion of the resources in this example is immaterial, so long as these proportions are maintained when comparing load and resources available. For example, 1 CPU millisecond may arbitrarily be said to be equal in scale to 1 megabyte of memory, for the purposes of visualizing shapes.

Graph 10 further shows the shape of a second resource type, type B. Compared to type A, type B has increased memory resources and decreased CPU resources. Accordingly, a set of devices of type B have sufficient CPU to host the load 12 with an excess CPU availability, and more than enough memory to host the load 12, resulting in excess memory availability. Thus, allocating the load to devices of type B would also result in inefficiency, as excess memory would exist.

To address this, it may be desirable to combine devices of type A and type B such that the overall shape of the devices in terms of resources is geometrically similar. For example, as shown in graph 20, a combination of devices of type A and type B could be combined to result in a heterogeneous fleet, with resources shaped into heterogenous shape 22, which is geometrically similar to load 12. Note that while the shape 22 is assumed for simplicity to be geometrically similar to load 12, it may occur in practice that a perfectly similar shape cannot be achieved due to the granularity of resources provided by a single device. Nevertheless, it is assumed that within a heterogenous fleet a shape of resources can be formed that is substantially similar to the shape of the load 12.

When the resources of a heterogenous fleet are similar in shape to the load, individual devices of the fleet can be spun down, effectively scaling the shape of the resources to match a scale of the load. As a result, the shape and scale of load and resources could substantially overlap, resulting in a reduction of excess resources and an increase in efficiency. This is shown for example in graph 30, where the shape of resources and load overlap, resulting in equal load and heterogenous resource shapes 32. In this configuration, excess resource usage of the fleet is minimized or eliminated.

While FIG. 1 depicts a two dimensional shape corresponding to two resources, the shape of load and/or resources may be characterized by any number of resources (e.g., as an n-dimensional shape). Thus, the particular shapes shown in FIG. 1 are illustrative in nature.

One difficulty with achieving the allocation of graph 30 is that load is often dynamic. That is, the particular resources required by a load can change over time, with the resulting shape of load also changing. As such, the composition of a heterogenous fleet required for optimal efficiency may also shift over time. Another difficulty with achieving the allocation of graph 30 is speed of operation. In many applications, it is desirable to allocate workloads as quickly as possible. Thus, it may be undesirable, for example, to delay taking on load in order to alter the shape of the resources of a heterogenous fleet.

Embodiments of the present disclosure address these problems while still achieving high resource efficiency within a heterogenous fleet. Specifically, embodiments of the present disclosure relate to dividing requests to execution workloads among different types of devices within a heterogenous fleet, such that the expected shape of resource usage on each type of device is substantially similar to a shape of the resources available among those types of devices. The number of each type of device (which may be viewed as a "sub-fleet") may then be scaled according to the load on that type of device. As a result, the overall shape of load on the heterogenous fleet can approach or achieve equality with the overall shape of load on the fleet, resulting in high efficiency of resource use on the fleet. This is shown, for example, in graphs 40 and 50 of FIG. 1, which divides the load 32 of graph 30 into two constituent shapes represent "sub-loads." In FIG. 1, the sub-loads of graphs 40 and 50 are equivalent to the load in graph 30. That is, the total CPU and memory usage of graphs 40 and 50 equals the total CPU and memory usage of graph 30. As can be seen in FIG. 1, the shape of the sub-load in graph 40 is geometrically similar to the shape of the resources of devices of type A shown in graph 10. Additionally, the shape of the sub-load in graph 50 is geometrically similar to the shape of the resources of devices of type B shown in graph 10. Accordingly, the number of devices of the respective types can be scaled such that graph 40 contains an identical sub-load and type A resource shape 42, and such that graph 50 contains an identical sub-load and type B resource shape 42. Thus, it can be seen that by properly routing load between devices of two resource types (e.g., to result in graphs 40 and 50), the efficiency of graph 30 can be achieved.

As discussed in more detail below, embodiments of the present disclosure provide for such routing by generating a set of n-dimensional decision surfaces, each with a dimensionality equal to that of a desired load shape. For example, where load is measured in terms of CPU and memory consumption, each decision surface may be a two dimensional. Each decision surface further corresponds to a sub-fleet among a heterogenous fleet, the sub-fleet corresponding to a given type of device (e.g., with the same or substantially similar resources in terms of the surface's dimensions). Each point with the decision surface can map the respective resource dimensions of the surface to a probability, with the respective probabilities of all decision surfaces at a given point summing to one. A routing device may reference the decision surfaces to determine where to route a given request, based on the expected load of that request. For example, where a request is expected to result in a load of m CPU usage and n memory usage, a routing device may locate the corresponding points on each decision surface to determine a probability of routing the request to respective sub-fleets. Illustratively, if a heterogenous fleet has two sub-fleets, the corresponding points on each decision surface may indicate a x % chance of routing to a first sub-fleet and a (100–x) % chance of routing to a second sub-fleet. The routing device can then select an appropriate sub-fleet according to the given probabilities. For example, the device may select a random number between 0 and 100, and route to the first sub-fleet if the number is less than or equal to x, or else route to the second sub-fleet. As discussed in more detail below, each decision surface can be calculated according to the current load on the respective sub-fleets and the expected change load on the respective sub-fleets during a future period of time, such that the expected total load on the respective sub-fleets during the future period of time has a shape geometrically similar to the resources of the sub-fleet.

Figure 2:
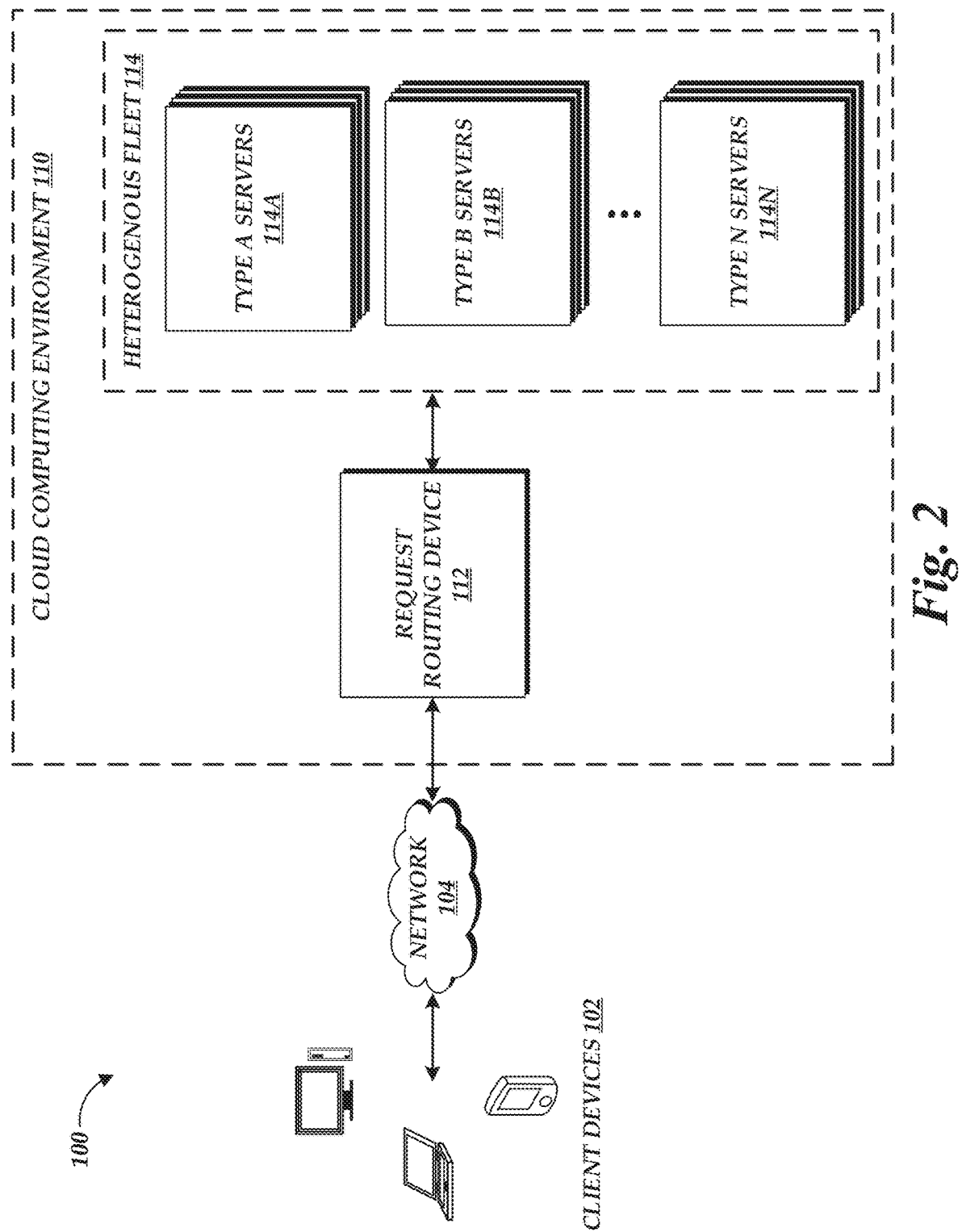
FIG. 2 is block diagram depicting an illustrative environment in which a cloud computing environment can operate to distribute requests among servers of a heterogenous fleet according to expected resource usage for servicing the requests and to decision surfaces generated to minimize a dissimilarity between a shape of predicted load on each sub-fleet within the fleet and a shape of resources available on that sub-fleet.

FIG. 2 is a block diagram of an illustrative operating environment 100 in which a cloud computing environment 110 may operate in accordance with embodiments of the present disclosure to provide a network-accessible service to client devices 102, with load among the service distributed in a manner that increases efficiency among resources of the service. By way of illustration, various example client computing devices 102 are shown in communication with the cloud computing environment 110, including a desktop computer, laptop, and a mobile phone. While shown in FIG. 2 as end user devices, client computing devices 102 can be any computing device, including end user computing devices such as a desktops, laptops or tablet computers, personal computers, wearable computers, personal digital assistants (PDAs), hybrid PDAs/mobile phones, mobile phones, electronic book readers, set-top boxes, voice command devices, cameras, digital media players, and the like, as well as non-user devices, such as servers that themselves provide network-accessible services to end user devices.

A cloud computing environment (sometimes referred to simply as a "cloud"), such as the environment 110 of FIG. 2, refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud computing environment 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud computing environment 110 can provide a variety of services to client devices 102, such as compute services (e.g., services enabling creation of on-demand processing power) and a block storage services (e.g., services enabling creation of on-demand block storage devices). Some implementations of the cloud computing environment 110 can additionally include domain name services ("DNS") services, object storage services, relational database services, and other service configurations for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via client devices 102, to access and configure resources provided by the various services.

The cloud computing environment 110 can provide on-demand, scalable computing platforms to users through the network 104, for example allowing users to have at their disposal scalable "virtual computing devices" via their use of a compute service and block storage service. These virtual computing devices have attributes of a personal computing device including hardware (various types of processors, local memory, random access memory ("RAM"), and hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud computing environment 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud computing environment 110 may deliver content from points of presence outside of, but networked with, these regions by way of edge locations and regional edge cache servers. This compartmentalization and geographic distribution of computing hardware enables the cloud computing environment 110 to provide low-latency resource access to customers on a global scale with a high degree of fault tolerance and stability.

As illustrated in FIG. 2, the cloud provider network 110 can communicate over network 104 with client devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

In FIG. 2, the environment 110 includes a heterogenous fleet 114 configured to provide a network-accessible service. The techniques described herein are widely applicable to a variety of services, and as such, the particular service provided by fleet 114 is not described in detail herein. However, each server 114 illustratively corresponds to a computing device—virtual or physical—configured with executable instructions to provide the service to client devices 102. The fleet 114 may illustratively be created by interaction between a user and the cloud computing environment 110, such as to provision compute resources of the environment 110 to provide the fleet 114. Alternatively, the fleet 114 may be provided by a service provider in order to provide the service to client devices 102. In one embodiment, the service provided by the fleet 114 is stateless, such that each request to interact with the service can be routed to any server within the fleet 114 regardless of past requests. Illustratively, the service might be an on-demand code execution service, also known as a "serverless computing service," such as that disclosed in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. A serverless computing service may benefit particularly from embodiments of the present disclosure, as such a service may require rapid distribution and handling of requests.

As shown in FIG. 2, the heterogenous fleet 114 includes a variety of types of servers, each of which may be referred to herein as a sub-fleet. In FIG. 2, these servers are shown as type A servers 114A, type B servers 114B, and type N servers 114N. The fleet 114 can include any number of different server types.

As discussed above, it is generally advantageous to route requests to interact with the service according to the resulting load on the service, such that the shape of load on each type of server matches the shape of resource availability on the set of servers of that type. Accordingly, FIG. 2 further includes a request routing device 112 configured to route requests to one of the types of servers 114A-N. For example, the request routing device 112 may, at least of a set of intervals (e.g., every n seconds, minutes, etc.) gather information reflecting an expected future load of the service (e.g., as aggregate usage of each resource type contributing to resource shape), and calculate based on that expected future load a decision surface for each service type mapping a load shape of an individual request to a probability of routing the request to the service type. Thereafter, the request routing device can obtain a request to interact with the service, and determine an expected load shape resulting from the individual request. The expected load shape can be determined, for example, form historical data regarding similar or associated request. Illustratively, where the service is a serverless computing service and the request is to execute code on the serverless computing system, the device 112 may obtain historical information identifying resource use metrics for past invocations of that code on the serverless computing system. The device 112 may then use, e.g., the average resource usage for past invocations as the expected resource usage for the current invocations. By mapping that expected resource usage to a point on the decision surfaces, the device 112 can determine a type of server to which to route the request. As a result, traffic is shaped among the server types in an efficient manner (e.g., with the load on each type being geometrically similar to the resources available on that type).

While a single request routing device 112 is shown in FIG. 2, embodiments of the present disclosure may include multiple request routing devices 112 that themselves act as a distributed service. Each request routing device 112 can implement the techniques described herein in order to gain the advantages of these techniques. In some instances, these techniques may be implemented with little or no synchronization of information or coordination between request routing devices 112, other than implementing the same techniques. In other instances, multiple request routing devices 112 may be coordinated to share at least some information during operation. For example, an individual request routing device 112 may calculate decision surfaces that are implemented by other request routing devices 112. However, it is expected that routing decisions may be made by request routing devices 112 individually. Thus, the speed of making such decisions is increased relative to potential techniques that require communication between request routing devices 112 when making a routing decision.

Notably, one advantage gained in embodiments of the present disclosure is the lack of requirement to select an individual server to which to route a request. That is, the request routing device 112 in some embodiments simply selects a type of server to which to route a request (e.g., a sub-fleet), without selecting an individual server to which the request is to be routed. This enables these embodiments to utilize any number of well known techniques for selecting an individual server from among the selected type. For example, the individual server may be randomly selected. In one embodiment, the request routing device 112 selects a type of server, and then routes the request to a load balancing device (not shown in FIG. 2) associated with the selected type of server. In another embodiment, the request routing device 112 first selects a type of server according to the present disclosure, and then selects an individual server of that type according to one of a number of possible load balancing techniques known in the art. Because embodiments of the present disclosure do not require selection of an individual device to which to route a request, the techniques described herein can be distinguished from existing load balancing techniques.

While FIG. 2 depicts a simplified environment 110, environments in practice may contain more or different components than shown in FIG. 2. For example, an environment in practice may include one or more "frontends" that directly obtain request from client devices 102, and that pass such request to the request routing device 112 when necessary (e.g., where a server is not already assigned to handle the request). Thus, the configuration of FIG. 2 is illustrative in nature.

As will be appreciated by one of skill in the art in light of the present disclosure, the embodiments disclosed herein improves the ability of computing systems, such as cloud computing environments, to efficiently allocate computing resources, enabling load to be distributed among different device configurations to shape the load according to the resources of that configuration and thus minimize inefficiency in use of those resources. Moreover, the presently disclosed embodiments address technical problems inherent within computing systems; specifically, the limited nature of computing resources in handling various loads, the variety of configurations of resources available, and the inherent complexities in allocating resources among those different configurations. These technical problems are addressed by the various technical solutions described herein, including the use of a request routing device that routes requests to different sub-fleets according to decision surfaces calculated to shape the load on those sub-fleets to be geometrically similar to the resources of those sub-fleets. Thus, the present disclosure represents an improvement in cloud computing environments and computing systems in general.

Figure 3:
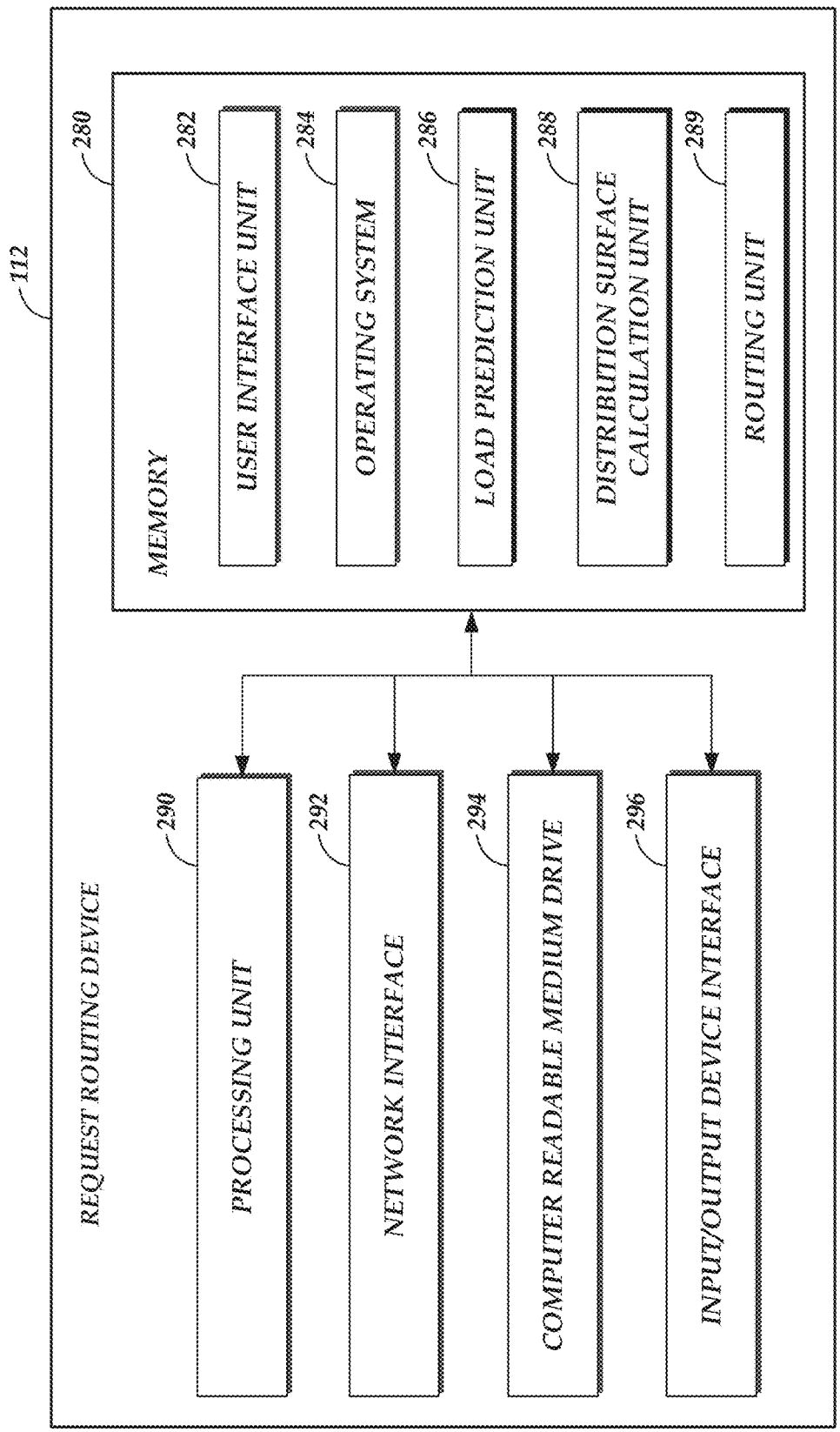
FIG. 3 depicts a general architecture of a computing device providing a request routing device that is configured to route requests among sub-fleets of the heterogeneous fleet of FIG. 2.

FIG. 3 depicts a general architecture of a computing system (referenced as request routing device 112) that operates to facilitate request routing between sub-fleets of a heterogenous fleet in accordance with embodiments of the present disclosure. The general architecture of the request routing device 112 depicted in FIG. 3 includes an arrangement of computer hardware and software modules that may be used to implement aspects of the present disclosure. The hardware modules may be implemented with physical electronic devices, as discussed in greater detail below. The request routing device 112 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 2. As illustrated, the request routing device 112 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the request routing device 112. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device, and an operating system 284. In addition, the memory 280 may include and/or communicate with one or more data repositories (not shown), for example, to access user program codes and/or libraries.

In addition to and/or in combination with the user interface unit 282 and operating system 284, the memory 280 may include a load prediction unit 286, distribution surface calculation unit 288, and routing unit 289 that may be executed by the processing unit 290. In one embodiment, the load prediction unit 286, distribution surface calculation unit 288, and routing unit 289 implement various aspects of the present disclosure. For example, the load prediction unit 286 can represent code executable to predict future load on the heterogenous fleet 114 based on historical load information. Prediction may occur via any number of known forecasting techniques, such as regression analysis, machine learning models, or the like. The surface calculation unit 288 may represent code executable to utilize the predicted load to generate distribution surfaces for each sub-fleet within the fleet 114. The routing unit 289 can represent code executable to route an individual request according to the decision surfaces.

As noted above, the decision surfaces may be generated by the request routing device 112 according to predicted load on the heterogenous fleet 114 at a given point in time. In one embodiment, the device 112 is configured to minimize headroom on each sub-fleet, where headroom is defined as 1 minus the maximum percentage usage across measured resources. For example, where routing occurred with respect to CPU and memory, a sub-fleet with 80% CPU and 70% memory usage would have a headroom of 20% (1 minus the maximum of 70% and 80%). This illustratively represents a proportion of the sub-fleet that can be "spun down" while still having sufficient resources to satisfy current requirements. Each sub-fleet can further be assigned a cost, which may represent a scarcity of devices within the sub-fleet. For example, devices of type A may be considered more valuable than devices of type B. Thus, the device 112 can be configured to minimize the total cost of the complement of headroom (or, in other terms, maximize cost-weighted headroom).

Consider for example a scenario in which a fleet includes two types of device, denoted as type 1 and type 2. The cost minimization of the two devices may be modeled according to the equation:

$$\text{minimize: } [\beta_1 \beta_2] \begin{bmatrix} \max\left\{ \frac{w_m(t)M(t)}{K_1^m}, \frac{w_c(t)C(t)}{K_1^c} \right\} \\ \max\left\{ \frac{1-w_m(t)M(t)}{K_1^m}, \frac{1-w_c(t)C(t)}{K_1^c} \right\} \end{bmatrix} \quad (1)$$

subject to:

$$w_m(t)M(t) \le K_1^m I_1$$

$$w_c(t)C(t) \le K_1^c I_1$$

$$(1-w_m(t)M(t)) \le K_2^m I_2$$

$$(1-w_c(t)C(t)) \le K_2^c I_2$$

$$0 \le w_m(t), w_c(t) \le 1$$

where:
M(t) represents the aggregate memory usage of a fleet at time t;
C(t) represents the aggregate CPU usage of a fleet at time t;
$w_m(t)$ represents a proportion of M(t) to be routed to devices of type 1;
$w_c(t)$ represents a proportion of C(t) to be routed to devices of type 1;
$\beta_1$ represents a cost of a single device of type 1;
$\beta_2$ represents a cost of a single device of type 2;
$I_1$ represents a number devices of type 1 in the fleet;
$I_2$ represents a number devices of type 2 in the fleet;
$K_1^m$ represents the per-device memory capacity of a device of type 1; and
$K_2^m$ represents the per-device memory capacity of a device of type 2.

In this equation, the first four constraints ensure that the total memory and CPU load allocated to each sub-fleet is not more than is available in the sub-fleet, while the fifth constraint ensures that the proportions are valid (e.g., between 0 and 1).

Equation (1) can reformulated to remove the max( ) operations by introducing new variables $x_1$ and $x_2$, as shown in equation (2) below.

$$\text{minimize: } [\beta_1 \beta_2] \begin{bmatrix} x_1 \\ x_2 \end{bmatrix} \quad (2)$$

subject to:

$$w_m(t)M(t) \le K_1^m I_1$$

$$w_c(t)C(t) \le K_1^c I_1$$

$$(1-w_m(t)M(t)) \le K_2^m I_2$$

-continued $$(1-w_c(t)C(t)) \le K_2^c I_2$$

$$0 \le w_m(t), w_c(t) \le 1$$

$$\frac{w_m(t)M(t)}{K_1^m} \le x_1$$

$$\frac{w_c(t)C(t)}{K_1^c} \le x_1$$

$$\frac{w_m(t)M(t)}{K_2^m} \le x_2$$

$$\frac{w_c(t)C(t)}{K_2^c} \le x_2$$

Note that the additional constraints of equation 2 ensure that both $x_1$ and $x_2$ remain larger than the terms in respective max( ) functions of equation 1, while the minimization objective ensures they stay no larger than necessary. Equation (2) can therefore be used to derive values of $w_m(t)$ and $w_c(t)$.

After deriving values of $w_m(t)$ and $w_c(t)$, decision surfaces satisfying these values can be determined by use of an appropriate Lagrangian according to the calculus of variations. To demonstrate, consider that the total load on a service may be divided into units associated with particular workloads on the service. Let s denote a particular workload associated with given memory and CPU usage ($m_s$ and $c_s$, respectively), and S denote the total set of workloads. The Gaussian kernel density estimate (KDE) of workloads in S at time t can then be represented as:

$$\Psi(m, c, t) \equiv \sum_{s \in S} N\left( \begin{bmatrix} m - m_s(t) \\ c - c_s(t) \end{bmatrix}, \Sigma \right) \quad (3)$$

where $\Sigma$ represents an appropriate choice of covariance matrix (e.g. sufficiently small to avoid truncation of the curves of each datapoint at gird edges). If $\Sigma$ is sufficiently small such that $\Psi$ vanishes on the boundary of D, then:

$$M(t) = \iint_D dm \, dc \, m\Psi(m,c,t) \quad (4)$$

$$C(t) = \iint_D dm \, dc \, c\Psi(m,c,t) \quad (5)$$

Similarly, the flux—the change in difference of the KDE surface over time $\Delta t$—can be defined as:

$$\psi(m,c,t) \equiv \Psi(m,c,t+\Delta t) - \Psi(m,c,t) \quad (6)$$

Given the equations above, a Lagrangian can be created that provides appropriate decision surfaces. The surface for an individual sub-fleet can be described as a function p(m, c, t), which provides the probability at time t that a workload with expected resource use of (m, c) is sent to the sub-fleet. Assume that the current memory and CPU usage of a type 1 sub-fleet are observable and represented as $M_1(t)$ and $C_1(t)$, respectively. The probability function p sought is then such that:

$$w_m(t)M(t) - M_1(t) = \iint_D dm \, dc \, m\psi(m,c,t)p(m,c,t) \quad (7)$$

$$w_c(t)C(t) - C_1(t) = \iint_D dm \, dc \, c\psi(m,c,t)p(m,c,t) \quad (8)$$

subject $0 \le p(m, c, t) \le 1$ for all values of m, c, and t.

In one embodiment, an objective can be chosen based on a current proportion of devices of each type, as given by the equation $$\kappa = \frac{I_1}{I_1 + I_2} \quad (9)$$

Accordingly, the functional minimized can be chosen as $$\iint_D \square\, dm\, dc(p-\kappa)^2 \quad (10)$$

Combining the above, an optimization problem can be stated as minimize: $J[p] \equiv \iint_D \square\, dm\, dc(p-\kappa)^2 \quad (11)$ subject to:

$G_0[p] \equiv \iint_D \square\, dm\, dc(p-s_0^2)=0$ $G_1[p] \iint_D \square\, dm\, dc(1-p-s_1^2)=0$ $G_2[p] \iint_D \square\, dm\, dc\, m\psi p - \Gamma_m = 0$ $G_3[p] \equiv \iint_D \square\, dm\, dc\, c\psi p - \Gamma_c = 0$ where $s_0^2$ and $s_1^2$ are positive slack variables introduced to transform inequality constraints into an equality, and where:

$$\Gamma_m = w_m(t)M(t) - M_1(t) \quad (12)$$

$$\Gamma_c = w_c(t)C(t) - C_1(t) \quad (13)$$

each of which is calculable based on observed and forecasted values.

The equations above then result in the Lagrangian:

$$\mathcal{L}(p,s_0,s_1,\lambda_0,\lambda_1,\lambda_2,\lambda_3) = (p-\kappa)^2 + \lambda_0(p-s_0^2)^\square + \lambda_1 (1-p-s_1^2) + \lambda_2 m\psi p + \lambda_3 c\psi p \quad (14)$$

which can be solved (e.g., using the Euler-Lagrange method) to yield:

$$\frac{\delta\mathcal{L}}{\delta p} = 2(p-\kappa) + \lambda_0 - \lambda_1 + \lambda_2 m\psi + \lambda_3 c\psi = 0 \quad (15)$$

$$\frac{\delta\mathcal{L}}{\delta s_0} = -2\lambda_0 s_0 = 0 \quad (16)$$

$$\frac{\delta\mathcal{L}}{\delta s_1} = -2\lambda_1 s_1 = 0 \quad (17)$$

Per equation (16), either $\lambda_0$ or $s_0$ must be zero. If so, then $p$ is also zero. If $\lambda_0$, then $p$ is greater than 0, and any term with $\lambda_0$ can be dropped. The same holds true with respect to $\lambda_1$ and $s_1$ in equation (17). Accordingly, $\lambda_0$ and $\lambda_1$ can be viewed as winsorizing $p$ between 0 and 1. As a result, equation (15) can be rewritten as $$p = \kappa + \tfrac{1}{2}\lambda_2 m\psi + \tfrac{1}{2}\lambda_3 c\psi \quad (18)$$

which, when winsorized, is equivalent to equation (15).

Constraints $G_2$ and $G_3$ can be used to solve for $\lambda_2$ and $\lambda_3$. Specifically, according to equation (18), $G_2$ and $G_3$, $\lambda_2$ and $\lambda_3$ are constants according to the following system of linear equations $$\lambda_2 \iint_D \square\, dm\, dc\, m^2\psi^2 + \lambda_3 \iint_D \square\, dm\, dc\, m c\psi^2 = \Gamma_m - \kappa(M(t+\Delta t) - M(t)) \quad (19)$$

$$\lambda_2 \iint_D \square\, dm\, dc\, mc\psi^2 + \lambda_3 \iint_D \square\, dm\, dc\, c^2\psi^2 = \Gamma_c - \kappa(C(t+\Delta t) - C(t)) \quad (20)$$

Note that the right hand sides of equations (19) and (20) are observable or forecastable values. Thus, the probability $p$ for any $(m,c,t)$ can be calculated according to equations (18)-(20).

In some cases, it may be preferable not to impose constraints $G_2$ and $G_3$ in equation (11). In such cases, these constraints can instead be encapsulated into the objective functional. For example, this might be accomplished according to the Lagrangian $$\mathcal{L}(p,s_0,s_1,\lambda_0,\lambda_1) = (\psi mp - |\psi|^n \kappa_m)^2 + (\psi cp - |\psi|^n \kappa_c)^2 + \lambda_0 (p - s_0^2)^\square + \lambda_1 (1-p-s_1^2) \quad (21)$$

where $n$ is a free parameter greater than or equal to zero and $$\kappa_m = \frac{\Gamma_m}{\psi_n} \quad (22)$$

$$\kappa_c = \frac{\Gamma_c}{\psi_n} \quad (23)$$

$$\psi_n = \iint_D dm\, dc |\psi|^n \quad (24)$$

This Lagrangian penalizes deviations from the desired constraints $G_2$ and $G_3$ in equation (11). The first term of this Lagrangian is zero only if equation (7) is satisfied, the second term only if equation (8) is satisfied. Since these two equations are global constraints and the Lagrangian defines the local dynamics, one can vary how much each neighborhood of $(m, c)$ contributes by a factor of $|\psi(m, c)|^n$ or so that areas where the flux magnitude is larger contribute more. In many cases, it can be expected that not all neighborhoods contribute equally. For example, where flux vanishes it will not contribute at all. According to the same solution and winsorization approach noted above, this Lagrangian can be solved as $$p = \text{sign}(\psi)|\psi|^{n-1}\left(\frac{m\kappa_m + c\kappa_c}{m^2 + c^2}\right) \quad (22)$$

Note that certain choices of $n$ simplify the equation above. For example, choosing $n=1$ results in flux contributing only through its sign and as an integrating factor in the denominators of $\kappa_m$ and $\kappa_c$. More specifically, when $n=1$, equation (24) can be represented as the aggregate change in workload volume (either positive or negative) flowing into or out of a service.

While the equations above assume two device types, a similar approach can result in equations to generate decision surfaces for any number $L$ of devices types. Specifically, a Lagrangian for $L$ device types can be stated as $$\mathcal{L}(p_i, s_{0,i}, \lambda_{0,i}, \lambda_1) = \Sigma_{i=1}^L [(\psi mp_i - |\psi|^n \kappa_{m,i})^2 + (\psi cp_i - |\psi|^n \kappa_{c,i})^2 - \lambda_{0,i}(p_i - s_{0,i}^2)] + \lambda_1(\Sigma_{i=0}^L p_i - 1) \quad (26)$$

In equation (22), the optimality condition to due $$\frac{\delta\mathcal{L}}{\delta s_{0,i}}$$

implies winsorization if $p_i$ is less than 0. The new condition on $p_i$ is $$\frac{\delta L}{\delta p_i} = p_i \psi^2(m^2 + c^2) - \text{sign}(\psi)|\psi|^{n-1}(m\kappa_{m,i} + c\kappa_{c,i}) - \lambda_{0,i} + \lambda_1 \quad (27)$$

which implies $$p_i = \frac{\text{sign}(\psi)|\psi|^{n-1}(m\kappa_{m,i} + c\kappa_{c,i})}{\psi^2(m^2 + c^2)} + \frac{\lambda_{0,i}}{\psi^2(m^2 + c^2)} + \frac{\lambda_1}{\psi^2(m^2 + c^2)} \quad (28)$$

Because all decision surfaces must equal one, then $$\lambda_1 = \frac{\text{sign}(\psi)|\psi|^{n-1}\sum_{i=1}^{L}(m\kappa_{m,i} + c\kappa_{c,i})}{L} + \frac{\sum_{i=1}^{L}\lambda_{0,i}}{L} - \frac{\psi^2(m^2+c^2)}{L} \quad (29)$$

Combining equations (25), (26), and (29) results in $$p_i = \frac{\text{sign}(\psi)|\psi|^{n-1}}{(m^2+c^2)}\left((m\kappa_{m,i} + c\kappa_{c,i}) - \frac{1}{L}\sum_{j=1}^{L}(m\kappa_{m,j} + c\kappa_{c,j})\right) + \quad (30)$$

$$\frac{1}{L} + \frac{1}{\psi^2(m^2+c^2)}\left(\lambda_{0,i} - \frac{1}{L}\sum_{j=1}^{L}\lambda_{0,j}\right)$$

With the functions $\lambda_{0,i}(m, c)$ being chosen so that each $p_i(m, c)$ is greater than or equal to zero at all points $(m, c)$. This results in a linear program of the form for every point $(m, c)$, $$\text{minimize:} \sum_{i=1}^{L}\lambda_{0},i \quad (31)$$

$$\text{subject to}: b(m, c) + \frac{I - \frac{1}{L}11^T}{\psi^2(m^2+c^2)}\Delta_0 \succeq 0$$

$$\Delta_0 \succeq 0$$

where $b(m, c)$ is the vector defined by a vectorization of the terms in the first line of equation (30) and $\Delta_0$ is the vectorization of $\lambda_{0,i}$s.

Accordingly, by use of current load values one on or more instance types, forecasted changes in those load values (e.g., calculated according to application of a forecasting model to historical load values), and the equations given above (e.g., one of equations (18), (25), or (28)), a request routing device 112 can generate a decision surface associating predicted load of an incoming request to a probability of routing the request to a given sub-fleet of a heterogeneous fleet 114. While the equations given above relate to two resource types, and thus generate a two-dimensional decision surface, a similar approach could be utilized to generate decision surfaces for any number of resource types.

Figure 4:
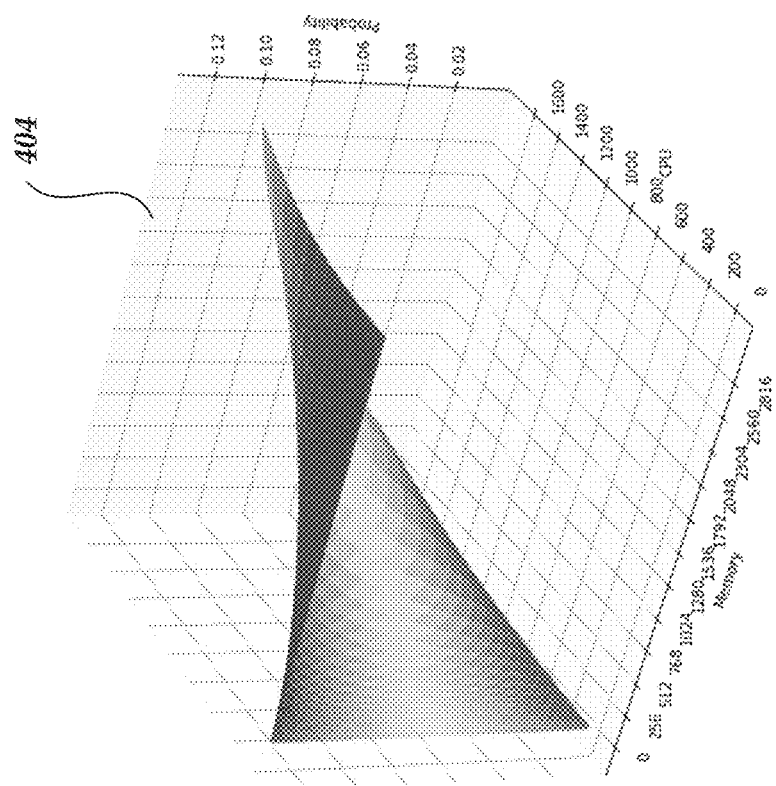
FIG. 4 shows illustrative visualizations of decision surfaces that may be calculated according to embodiments of the present disclosure.
Figure 4:
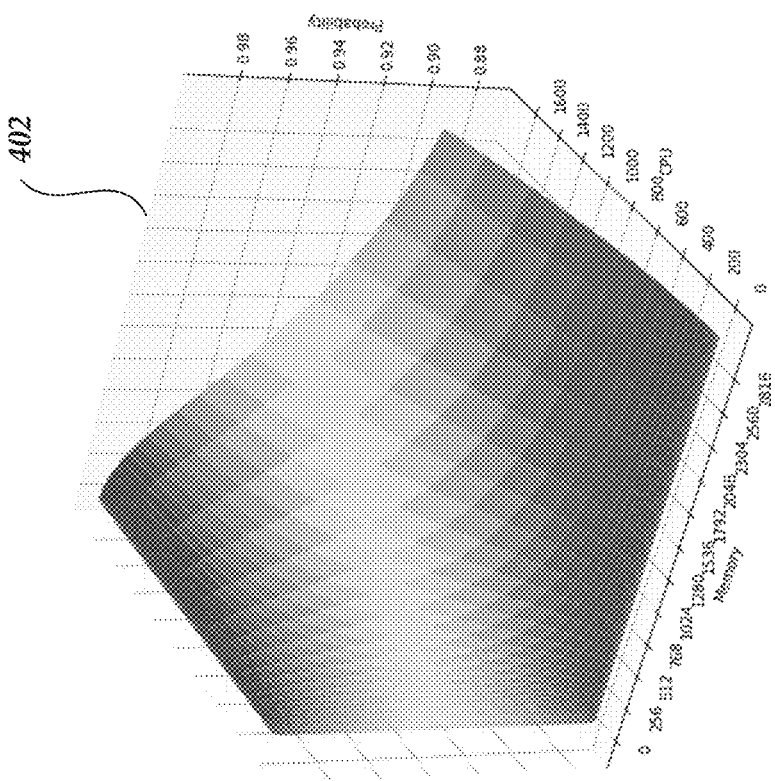

One example of a set of decision surfaces generated according to the equations above is shown in FIG. 4. Specifically, FIG. 4 depicts two decision surfaces 402, 404, generated according to the equation (25), with n set to 1. The first decision surface 402 corresponds to a sub-fleet of a first device type, having relatively more CPU resources and less memory resources than a sub-fleet of a second device type, which corresponds to the second decision surface 404. Thus, as expected utilization of memory rises and/or expected CPU usage falls, the probabilities of routing to the sub-fleet of the second device type increases. The decision surfaces of FIG. 4 may be recalculated on set intervals by the device 112, such as each 30 seconds, each minute, each five minutes, etc., according to the computational abilities of the device 112 and the desired accuracy of routing. Note that due to the use of probabilities within the surfaces 402, 404, multiple devices 112 may implement routing according to these surfaces without a requirement that such devices communicate their routing decisions to one another. Thus, routing according to the surfaces 402, 404 can be accomplished very quickly. Moreover, as can be seen by the equations above, the surfaces 402, 404 can be calculated to minimize a cost function corresponding to costs of relative devices (e.g., according to their scarcity or value), enabling a cloud computing environment 110 to minimize overhead across device types, and providing an ability to scale device types according to load with minimal inefficiency.

While FIG. 4 depicts two specific types of computing resource—CPU and RAM—a variety of types or resources may be reflected in a decision surface. Such resources include, but are not limited to, various types of processor utilization (e.g., CPU use, graphical processor unit (GPU) use, tensor processor unit (TPU) use, etc.), various types of memory use (e.g., RAM, persistent memory such as disk drives or solid state drives, etc.), various types of bandwidth use (e.g., of a network or other communication bus), and various types of programmatic resource use (e.g., threads, memory slots, etc.).

Figure 5:
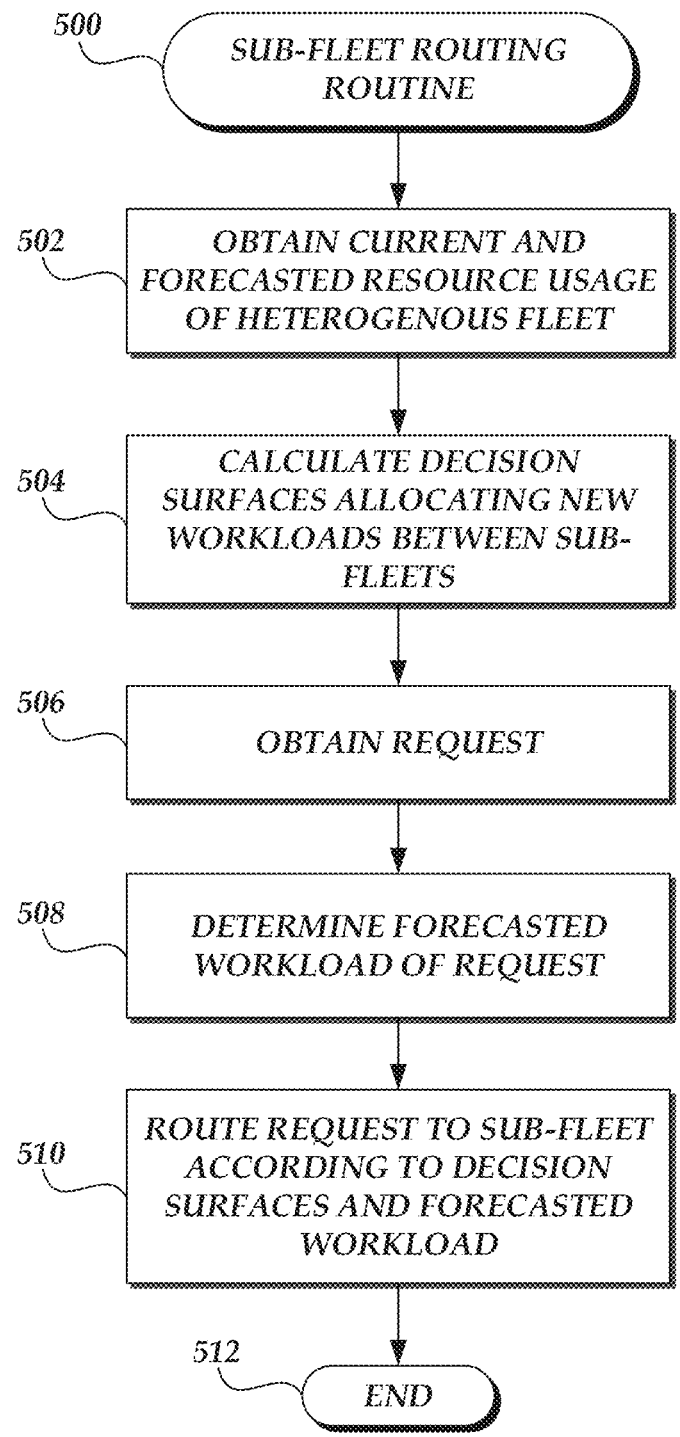
FIG. 5 is a flow chart depicting an illustrative routine for routing requests among sub-fleets of the heterogeneous fleet of FIG. 2.

One example of a routine that may be implemented by a request routing device 112 to route requests in accordance with embodiments of the present disclosure is shown in FIG. 5. The routine 500 begins at block 502, where the device 112 obtains current and forecasted resource usage of a heterogenous fleet. The forecasted usage may correspond for example, to a future period of time during which a decision surface is to be applied, such as the next i minutes. In some instances, the forecasted and current usage may be aggregate values across the fleet (e.g., total expected memory and CPU usage). In other instances, the forecasted and/or current usage may be a set of values, such as values for each combination of resources.

At block 504, the device 112 calculates a decision surface for each sub-fleet of the heterogenous fleet, that allocates new workloads among the sub-fleets to minimize overhead across the fleet. Overhead may be calculated as noted above, such as according to a difference in expected load shape on the sub-fleet relative to a resource shape of the sub-fleet. The surfaces are illustratively m-dimensional surfaces, with each dimension corresponding to a resource of the fleet, and with the sum of all surfaces equaling 1 (e.g., all probabilities equal 100). The surfaces can be calculated according to the calculus of variations, such as according to the equations set forth above (e.g., one of equations (18), (25), or (28)). In the context of the present disclosure, calculation of the decision surface may thus include determining variable values as appropriate, and placing these values into the equations set forth above.

At block 506, the device 112 obtains a request to initiate a new workload on the fleet. For example, the request may correspond to a request to execute code on a serverless computing system.

At block 508, the device 112 determines a forecasted workload of the request. The forecasted workload may represent, for example, the output of application of a forecasting algorithm to historical resource usage of the request. In one instance, the forecasted workload may represent the average expected resource usage of the requested workload. In another instance, the forecasted workload can represent another statistical measure of the expected resource usage, such as a percentile value corresponding to the expected usage (e.g., a value range that usage is expected to fall within for n % of workloads related to the request). In some instances, the forecasted workload may represent a distribution of expected usage values for one or more resources.

At block 510, the device 112 routes the request to a sub-fleet according to the decision surfaces and the forecasted workload. For example, the device 112 may input the forecasted workload into the decision surfaces (e.g., into the formulas given above) to determine a set of probabilities associated with a location on the decision surface corresponding to the forecasted workload, with the each probability of the set defining a sub-range in the range of 0 to 100. Where the forecasted workload is represented as a distribution of values, known statistical techniques (e.g., a convolution) may be used to apply the distributions to the decision surfaces and thus generate probabilities. Illustratively, where two device types exist within the fleet, application of a forecasted workload to the decision surfaces may result in a 20% probability of routing to a first device type, and an 80% probability of routing to the second device type. This can then be modeled as the range $0 < i \leq 20$ corresponding to the first device type, and the range $20 < i \leq 100$ corresponding to the second device type. The device 112 may then select a sub-fleet to which to route the request according to the set of probabilities, such as by selecting a random value greater than 0 and less than or equal to 100, and routing the request to the sub-fleet whose range encompasses the random value. Illustratively, the device 112 may route the request to a load balancer associated with the sub-fleet, which may in turn route the request to an individual device configured to handle the request, e.g., by initiating the requested workload.

The routine 500 then ends at block 512. Accordingly, via implementation of the routine 500, a device 112 can be enabled to route between different sub-fleets in a manner that minimizes resource overhead associated with the sub-fleets, and thus increases efficiency of usage of the fleet generally.

The routine 500 may in some embodiments be modified or combined with other functionalities. As an example, a load balancer may be implemented at each sub-fleet, and configured to obtain a request (e.g., from the request routing device 112) and to select an individual device of the sub-fleet to which to route the request. The load balancer may balance load among individual devices according to any number of known functionalities. Operation of the load balancer can be further improved by implementation of routine to route workloads based on correlations or anti-correlations with existing workloads on target devices, such as by biasing selection of servers to avoid selection of servers with existing workloads that are correlated to a workload being routed, and to prefer selection of servers with existing workloads that are anti-correlated to the workload being routed. An example of such a routine is disclosed in U.S. patent application Ser. No. 17/208,959, entitled "EFFICIENT ALLOCATION OF WORKLOADS BASED ON CORRELATED WORKLOAD CLUSTERS" and filed concurrently with the present application, the entirety of which is hereby incorporated by reference. As another example, operation of a load balancer can be further improved by implementation of a routine to bias selection of servers according to age. An example of such a routine is disclosed in U.S. patent application Ser. No. 17/209,008, entitled "ALLOCATION OF WORKLOADS IN DYNAMIC WORKER FLEET" and filed concurrently with the present application, the entirety of which is hereby incorporated by reference. In some instances, a load balancer may implement a combination of the techniques of the '_2_ Application and '_3_ Application. For example, a load balancer may implement the routine 600 of the '_2_ Application, such as by modifying blocks 608 and 610 of the routine 600 of the '_2_ Application such that selection occurs according to a biased probability distribution, as disclosed the '_3_ Application. Thus, the routine 500 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
 a heterogenous fleet of computing devices configured to implement workloads on behalf of client computing devices, the heterogenous fleet comprising:
  a first sub-fleet including computing devices having a first configuration of computing resources comprising at least a first type of computing resource and a second type of computing resource; and
  a second sub-fleet including computing devices having a second configuration of computing resources comprising at least the first type of computing resource and the second type of computing resource; and one or more computing devices configured to route requests to initiate new workloads between the first and second sub-fleets by:

obtaining forecasted resource usage levels for the heterogenous fleet over a future period of time, the forecasted resource usage levels for the heterogenous fleet reflecting at least forecasted use within the heterogenous fleet of the first type of computing resource and the second type of computing resource during the future period of time;

calculating (i) a first decision surface for the first sub-fleet, the first decision surface mapping potential usage values of the first and second types of computing resources to probabilities of routing requests with the potential usage values to the first sub-fleet and (ii) a second decision surface for the second sub-fleet, the second decision surface mapping the potential usage values of the first and second types of computing resources to probabilities of routing requests with the potential usage values to the second sub-fleet, wherein the probabilities within the first decision surface and the probabilities within the second decision surface sum to one and are calculated according to the forecasted resource usage levels for the heterogenous fleet during the future period of time and to minimize dissimilarities between shapes of computing resource use and shapes of computing resource capacity on each sub-fleet of the heterogeneous fleet;

obtaining a request to initiate a new workload;

determining expected usage values of the first and second types of computing resources for the new workload; and routing the request to a selected sub-fleet selected from the first and second sub-fleets according to application of the expected usage values of the first and second types of computing resources for the new workload to the first and second decision surfaces.

2. The system of claim 1, wherein the heterogenous fleet is associated with a serverless computing system, and wherein the new workload is execution of code on the serverless computing system.

3. The system of claim 1, wherein each of the first and second sub-fleets further comprise a load balancing device configured to route the request to an individual computing device of the respective sub-fleet, and wherein routing the request to the selected sub-fleet comprises routing the request to the load balancer of the selected sub-fleet.

4. The system of claim 1, wherein each of the first and second types of computing resources correspond to at least one of processor time, memory, or bandwidth.

5. A computer-implemented method comprising:

obtaining a request to initiate a new workload on a heterogenous fleet of computing devices configured to implement workloads on behalf of client computing devices, the heterogenous fleet comprising a plurality of sub-fleets, each sub-fleet having a distinct configuration of at least two types of computing resources;

determining expected usage values of the at least two types of computing resources for the new workload; and routing the request to a selected sub-fleet of the heterogenous fleet selected according to application of the expected usage values of the at least two types of computing resources for the new workload to a set of decision surfaces, wherein each decision surface, of the set of decision surfaces corresponds to a sub-fleet of the plurality of sub-fleets, wherein each decision surface, of the set of decision surfaces, maps potential usage values of the at least two types of computing resources to probabilities of routing the requests with the potential usage values to the sub-fleet, and wherein the probabilities across the set of decision surfaces sum to one and are calculated according to forecasted usage levels for the at least two types of computing resources on the heterogenous fleet during a future period of time and to minimize dissimilarities between shapes of computing resource use and shapes of computing resource capacity on each sub-fleet of the heterogeneous fleet.

6. The computer-implemented method of claim 5, wherein the forecasted usage levels are calculated as a combination of current usage levels for the at least two types of computing resources on the heterogenous fleet and forecasted change in usage levels for the at least two types of computing resources on the heterogenous fleet during the future period of time.

7. The computer-implemented method of claim 6, wherein the forecasted change in usage levels for the at least two types of computing resources on the heterogenous fleet during the future period of time is at least one of an aggregate forecasted change in usage level of each resource type of the at least two types of computing resources or a n-dimensional surface reflecting the forecasted change in usage levels for the at least two types of computing resources at points on the n-dimensional surface, wherein each dimension of the n-dimensional surface corresponds to a resource type of the at least two types of computing resources.

8. The computer-implemented method of claim 5, wherein the shapes of computing resource use on each sub-fleet of the heterogenous fleet have n dimensions, each dimension of the n dimensions corresponding to at least one resource of the at least two types of computing resources, and wherein the dimensionality of each decision surface equals the dimensionality of the shapes of computing resource use on each sub-fleet of the heterogenous fleet.

9. The computer-implemented method of claim 5, wherein the shape of the computing resources on the heterogeneous fleet is determined according to a proportion of a first resource type of the at least two types of computing resources on the heterogeneous fleet to a second resource type of the at least two types of computing resources.

10. The computer-implemented method of claim 5, wherein at least one of the expected usage values corresponds to a distribution of potential values.

11. The computer-implemented method of claim 5, wherein the set of decision surfaces are further calculated to minimize a total cost assigned to the heterogenous fleet, the total cost reflecting a combination of costs associated with each sub-fleet of the plurality of sub-fleets, wherein the cost associated with each sub-fleet is based weighting headroom associated with the sub-fleet against a per-device cost for the sub-fleet, and wherein the headroom associated with each sub-fleet is the mathematical complement to a maximum percentage use among percentage uses of the sub-fleet of each resource of the at least two types of computing resources.

12. The computer-implemented method of claim 5, wherein each sub-fleet of the plurality of sub-fleets comprises a load balancing device configured to route the request to an individual computing device of the respective sub-fleet, and wherein routing the request to the selected sub-fleet comprises routing the request to the load balancer of the selected sub-fleet.

13. One or more non-transitory computer-readable media comprising computer executable instructions that, when executed on a computing system, cause the computing system to:
   obtain a request to initiate a new workload on a heterogenous fleet of computing devices, the heterogenous fleet comprising a plurality of sub-fleets, each sub-fleet having a distinct configuration of at least two types of computing resources;
   determine expected usage values of the at least two types of computing resources for the new workload; and
   route the request to a selected sub-fleet of the heterogenous fleet selected according to application of the expected usage values of the at least two types of computing resources for the new workload to a set of decision surfaces, wherein each decision surface, of the set of decision surfaces, corresponds to a sub-fleet of the plurality of sub-fleets, wherein each decision surface, of the set of decision surfaces, maps potential usage values of the at least two types of computing resources to probabilities of routing the requests with the potential usage values to the sub-fleet, and wherein the probabilities across the set of decision surfaces sum to one and are calculated according to forecasted usage levels for the at least two types of computing resources on the heterogenous fleet during a future period of time and to minimize dissimilarities between shapes of computing resource use and shapes of computing resource capacity on each sub-fleet of the heterogeneous fleet.

14. The one or more non-transitory computer-readable media of claim 13, wherein the forecasted usage levels are calculated as a combination of current usage levels for the at least two types of computing resources on the heterogenous fleet and forecasted change in usage levels for the at least two types of computing resources on the heterogenous fleet during the future period of time.

15. The one or more non-transitory computer-readable media of claim 14, wherein the forecasted change in usage levels for the at least two types of computing resources on the heterogenous fleet during the future period of time is at least one of an aggregate forecasted change in usage level of each resource type of the at least two types of computing resources or a n-dimensional surface reflecting the forecasted change in usage levels for the at least two types of computing resources at points on the n-dimensional surface, wherein each dimension of the n-dimensional surface corresponds to a resource type of the at least two types of computing resources.

16. The one or more non-transitory computer-readable media of claim 13, wherein the shapes of computing resource use on each sub-fleet of the heterogenous fleet have n dimensions, each dimension of the n dimensions corresponding to at least one resource of the at least two types of computing resources, and wherein the dimensionality of each decision surface equals the dimensionality of the shapes of computing resource use on each sub-fleet of the heterogenous fleet.

17. The one or more non-transitory computer-readable media of claim 13, wherein the shape of the computing resources on the heterogeneous fleet is determined according to a proportion of a first resource type of the at least two types of computing resources on the heterogeneous fleet to a second resource type of the at least two types of computing resources.

18. The one or more non-transitory computer-readable media of claim 13, wherein minimizing the dissimilarity in the shape of load on the heterogenous fleet and the shape of the computing resources on the heterogeneous fleet corresponds to minimizing dissimilarities between shapes of load on each sub-fleet of the heterogenous fleet and respective shapes of computing resources on each sub-fleet.

19. The one or more non-transitory computer-readable media of claim 13, wherein the set of decision surfaces are further calculated to minimize a total cost assigned to the heterogenous fleet, the total cost reflecting a combination of costs associated with each sub-fleet of the plurality of sub-fleets, wherein the cost associated with each sub-fleet is based weighting headroom associated with the sub-fleet against a per-device cost for the sub-fleet, and wherein the headroom associated with each sub-fleet is the mathematical complement to a maximum percentage use among percentage uses of the sub-fleet of each resource of the at least two types of computing resources.

20. The one or more non-transitory computer-readable media of claim 13, wherein each sub-fleet of the plurality of sub-fleets comprises a load balancing device configured to route the request to an individual computing device of the respective sub-fleet, and wherein routing the request to the selected sub-fleet comprises routing the request to the load balancer of the selected sub-fleet.

* * * * *

UNITED STATES PATENT AND TRADEMARK OFFICE
CERTIFICATE OF CORRECTION

| | | |
|---|---|---|
| PATENT NO. | : 11,470,015 B1 | Page 1 of 1 |
| APPLICATION NO. | : 17/208979 | |
| DATED | : October 11, 2022 | |
| INVENTOR(S) | : Christopher Kakovitch et al. | |

It is certified that error appears in the above-identified patent and that said Letters Patent is hereby corrected as shown below:

In the Specification

In Column 11, Line 40 (Approx.), delete "number devices," and insert --number of devices,--.

In Column 11, Line 41 (Approx.), delete "number devices," and insert --number of devices,--.

In Column 13, Line 44 (Approx.), delete "so," and insert --$s_0$,--.

In Column 14, Line 22 (Approx.), delete "or so" and insert --so--.

In Column 14, Line 33 (Approx.), delete "(22)" and insert --(25)--.

In Column 14, Line 37 (Approx.), delete "Km" and insert --κm--.

In the Claims

In Column 20, Claim 5, Line 2, delete "surfaces" and insert --surfaces,--.

Signed and Sealed this
Thirty-first Day of January, 2023

Katherine Kelly Vidal
*Director of the United States Patent and Trademark Office*